March 16, 1948. W. R. CUSTER 2,437,684
AIRCRAFT HAVING HIGH-LIFT WING CHANNELS
Filed Aug. 31, 1940 3 Sheets-Sheet 1
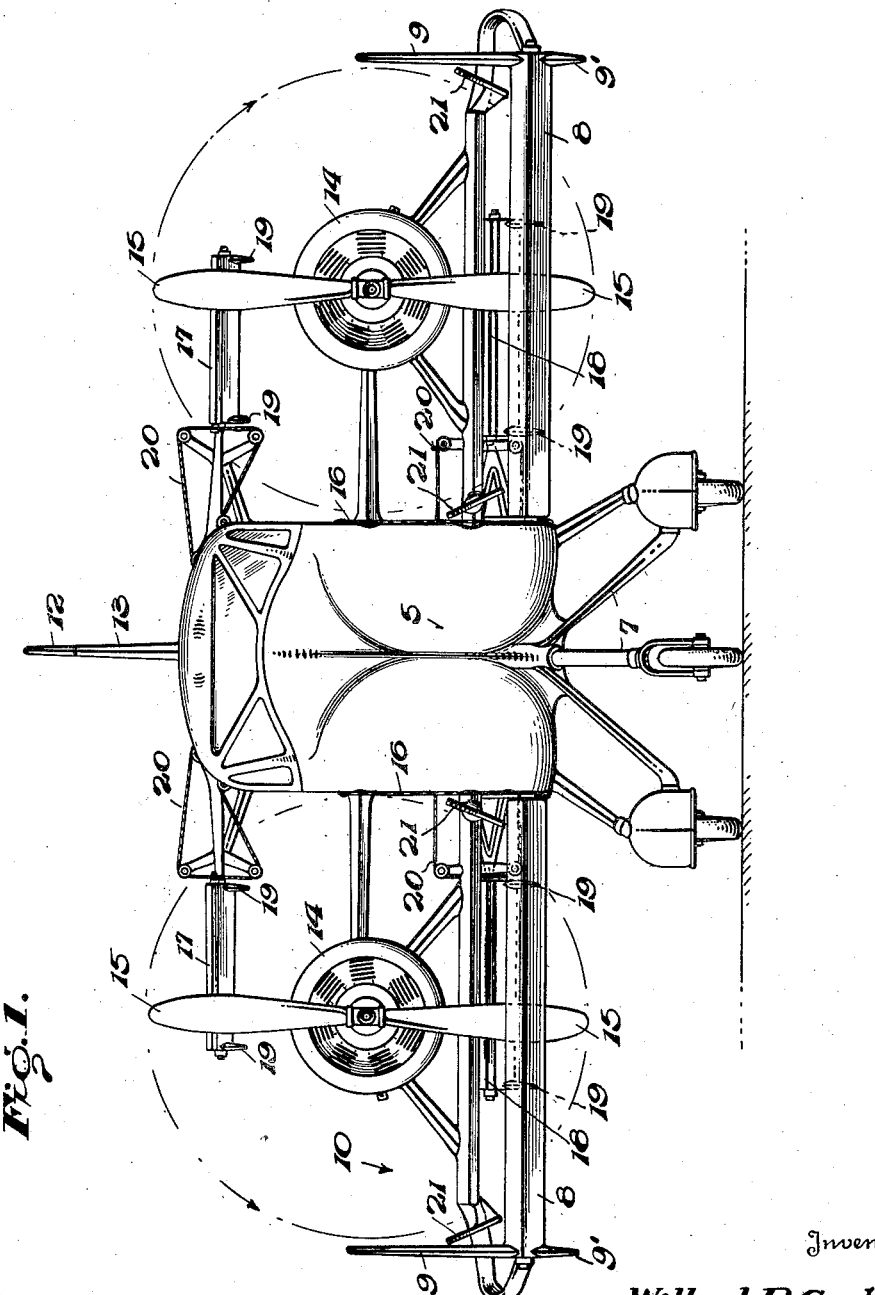
Inventor
Willard R. Custer.
By Bernard F. Garvey.
Attorney March 16, 1948.  W. R. CUSTER  2,437,684
AIRCRAFT HAVING HIGH-LIFT WING CHANNELS
Filed Aug. 31, 1940  3 Sheets-Sheet 2
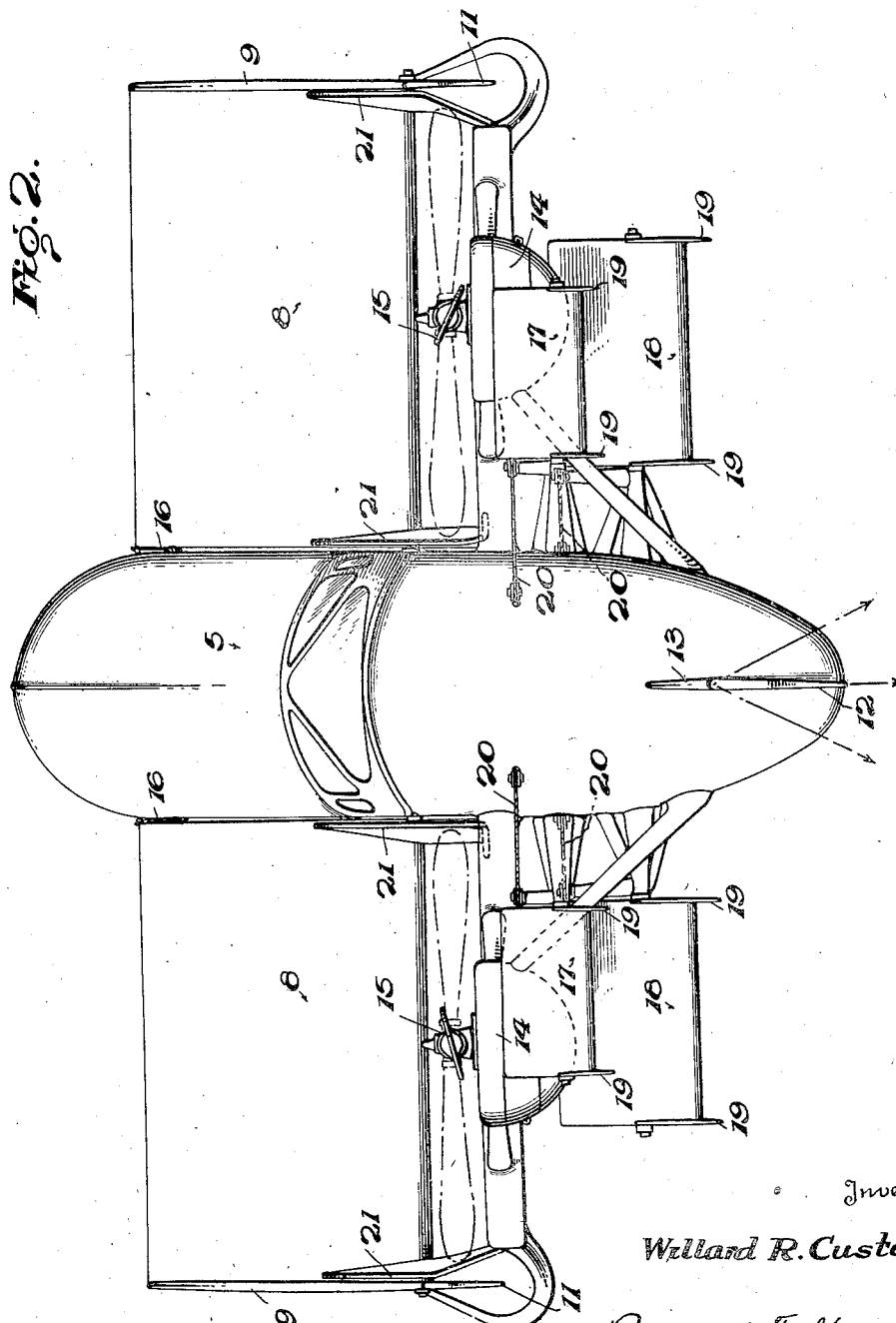
Inventor
Willard R. Custer.
Bernard F. Garvey.
Attorney March 16, 1948.  W. R. CUSTER  2,437,684
AIRCRAFT HAVING HIGH-LIFT WING CHANNELS
Filed Aug. 31, 1940  3 Sheets-Sheet 3
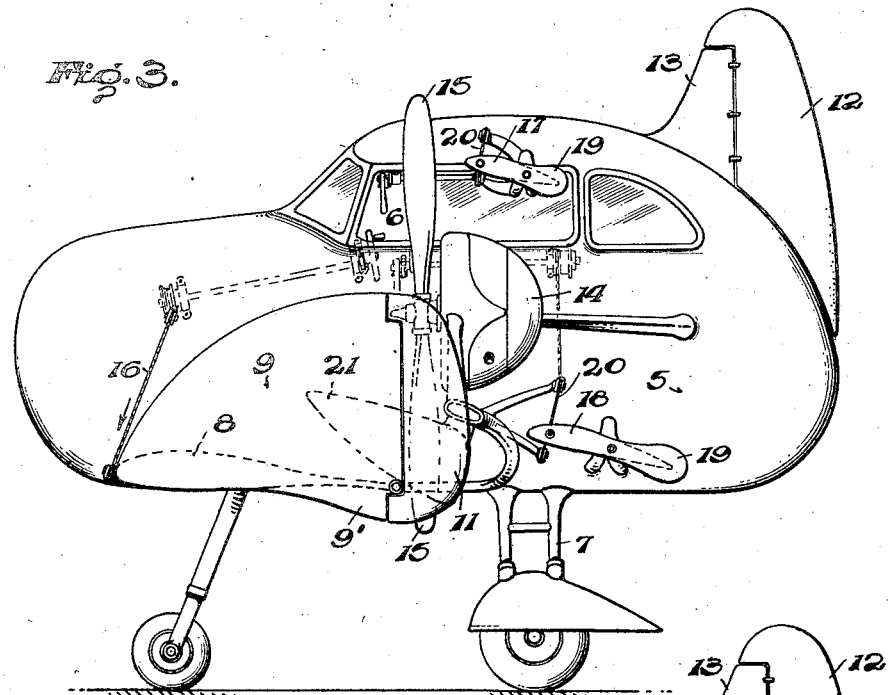
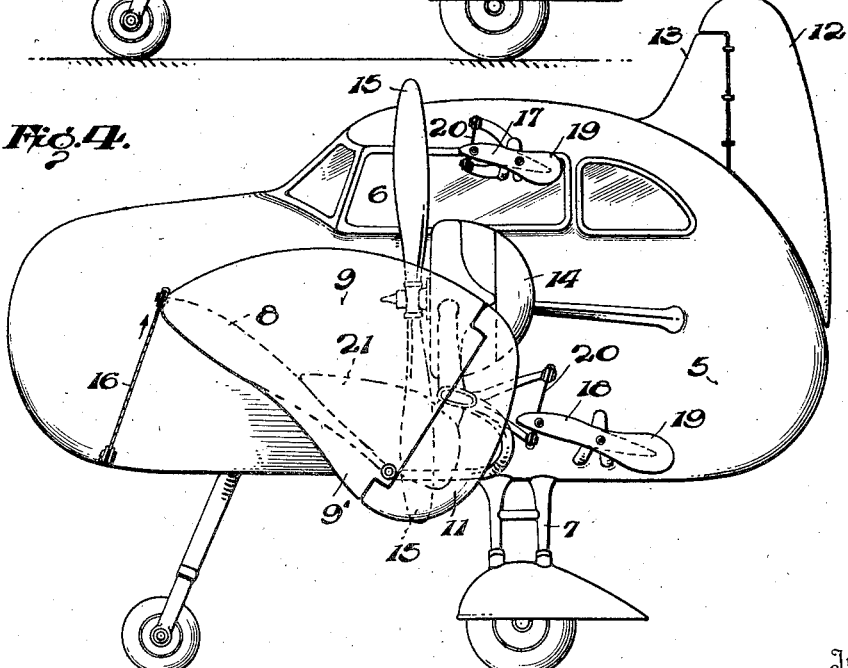
Inventor
Willard R. Custer.
By Bernard F. Garvey.
Attorney Patented Mar. 16, 1948

2,437,684

UNITED STATES PATENT OFFICE 2,437,684

AIRCRAFT HAVING HIGH-LIFT WING CHANNELS

Willard R. Custer, Hagerstown, Md.

Application August 31, 1940, Serial No. 355,055

5 Claims. (Cl. 244—12)

The present invention consists of an aeroplane of the vertical lift type.

After much experiment I have found that vertical lift is possible of accomplishment without the use of vertical axis propellers and with a complete absence of drag or parasite resistance in flight, abbreviated wings and fuselage being used to permit rise and landing in a minimum area.

My experiments have shown that by using pusher type propellers with adjustable wings of especial construction, the propellers being located in close proximity to the trailing edges of the wings, it is possible to produce a low air pressure or vacuum area immediately above the wings, which coupled with elevators critically positioned on the fuselage and mounted in the slip stream of the propellers effects instant vertical rise without preliminary runs and permits landing in a stand-still position.

The wing structure of my invention provides, in conjunction with the sides of the fuselage, air channels or troughs through which the incoming air to the propellers pass forming, when the leading edges of the wings are tilted upwardly, a pocket to effect vertical lift of the plane, the wings being operable into a horizontal position for normal wing function when the desired altitude has been attained.

Other objects of the invention will be understood from the following description of the present preferred form of the invention taken in connection with the accompanying drawings wherein Fig. 1 is a front elevational view of an aeroplane constructed in accordance with the present invention, Fig. 2 is a top plan view of the same, Fig. 3 is a side elevational view of the plane showing the position of the wings when the plane is in flight, and Fig. 4 is a similar view showing the position of the wings for a take-off or landing the plane.

The device of this invention consists of a fuselage or body 5 of streamline contour, the fuselage being abbreviated by omitting the tail structure common to conventional planes. The fuselage is provided with the usual cockpit 6 from which point the controls are operated in the usual manner. Pending from the bottom of the fuselage is a landing gear generally designated 7 of any standard construction preferably positioned substantially as illustrated in Figs. 3 and 4 of the drawings.

Extending laterally from opposite sides of the fuselage are a pair of wings 8 preferably located fore of a line drawn through the vertical axis of the plane. The wings are adjustably mounted on the fuselage to permit tilting thereof as illustrated in Fig. 4. The terminal of each wing is provided with an integral fin 9. Each fin extends upwardly from the top surface of the wing in parallel relation with the sides of the fuselage to provide a channel or trough, indicated by the arrows 10 of Fig. 1. The fins 9 may have portions thereof extended below the lower faces of the wings to provide supplemental fins 9'. It is to be understood that the wings 8 of the present invention are relatively shorter than the wings on standard aeroplanes and in use of this type of wing the fins 9 and 9' are mounted on the wing terminals. It is to be understood, however, that if desired, a greater wing spread may be provided with the fins 9 and 9' located at a predetermined intermediate point on the wings.

Preferably I employ in the present invention lateral rudders which may be attached to the fins 9 and 9'. Each of said rudders, indicated at 11, is hingedly or pivotally mounted on a fin back of the trailing edge of the wing as advantageously illustrated in Figs. 3 and 4. The rudders are laterally operable from the cockpit by standard operating rods or cables.

In addition to the rudders 11, I may employ a tail rudder 12 which is pivotally mounted on a fin 13 which latter issues from the top surface of the fuselage at the aft end of the latter. The rudder 12 is also operated in a manner well known in the art.

Mounted on each side of the fuselage 5 back of the wings 8 is a motor 14 adapted to drive a propeller 15 with which it is operably connected. Of the essence of importance in the present invention is the positioning of the propellers which are located in very close proximity to the trailing edges of the wings to eliminate the possibility of an air leak from a point beneath the wings and over the trailing edges thereof into the channels or troughs 10. Upon reference to Fig. 1 of the drawings, it will be noted that the radii of the propellers are between the fins 9, the sides of the fuselage and points slightly above the top of the fuselage and a short distance below the bottom faces of the wings 8. The air coming into the propellers is directed in the channels or troughs 10 and trapped when the wings are tilted upwardly to provide air pockets on both sides of the fuselage.

To effect tilting of the wings 8 and the appurtenances associated therewith I provide conventional control cables 16 attached to the wings, the cables being trained into the cockpit in a well known manner. When the wings are tilted upwardly the plane is in position for vertical rise or landing, the wings being operable into a normal horizontal position as soon as the plane reaches its desired altitude. It is to be noted that the leading edges of the wings 8 and fins 9 are sharp to provide knife edges to cut down air resistance. To assist in the vertical rise of the plane I provide on each side of the fuselage an upper and lower elevator designated 17 and 18 respectively. These elevators supplement the wings 8 and also operate as stabilizers when the plane is in flight. The upper elevators may be smaller than the lower and are mounted directly above the latter. Both the upper and lower elevators are offset with regard to a line drawn horizontally through the axes of the propellers. Each of the elevators is provided on its terminals with fins 19 which latter, as shown to advantage in Figs. 3 and 4 extend above, below, and beyond the trailing edges of the elevators. Each of the elevators 17 and 18 is adjustably mounted and operable by suitable control means 20 connected directly to the elevators.

The elevators being mounted in the slip stream of the propellers supplement the lifting action of the wings 8 when vertical rise is to be consummated. In flight the elevators also augment the work of the wings 8 and continue to supplement the wing action in landing.

As already stated herein, the propellers 15 are mounted in such close proximity to the trailing edges of the wings that the passage of air from a point below the wing surfaces is prevented. To further avoid the possibility of air getting into the troughs or channels 10 at the ends of the wings, I provide baffles 21.

I have found from experiment that the construction and mounting of the wings 8 and the mounting of the fins 9 and 9' thereon is necessary to the successful operation of this invention. The fins 9 and 9', in addition to making up a part of the vacuum trap or trough 10, likewise give the efficiency of a one-third larger wing spread.

When in operation, one of the propellers rotates in a clockwise direction and the other in a counter-clockwise direction. I have found that with the present construction of aeroplane when the motors are operating at approximately 4,000 R. P. M's. air is removed from the trough or channel 10 a great deal faster than it can be replaced thereby establishing a low pressure area or vacuum in the trough or channel with a high pressure area beneath the wings. The portions of the fins 19 extending upwardly above the upper faces of the elevators prevents relief of the vacuum above the wing area while the portions of these fins which extend below the lower faces of the elevators prevent air pressure from escaping around the ends of the elevators. I have found that the action of the elevators greatly augments the lifting power of the wings of the present invention.

It is, of course, to be understood that I have illustrated in the present invention only a general form of the invention which I have found from many experiments operates to attain the object of the present invention. I am aware that various changes may be made in this invention, such as variation in the length of the wings and the position of the fins thereon, the number of motors used and the location of the rudder or rudders. I am also aware that changes may be made in the details of construction and arrangement of parts within the scope of the claims hereto appended.

What is claimed is:

1. An airplane including a fuselage, wings carried by the opposite sides of the fuselage, propellers adjacent the wings, means mounting the propellers on the airplane with their axes extending generally fore and aft above the wings and the propeller discs covering a major portion of the trailing edge of the wings, mechanism mounting said wings for angular adjustment about their rear edges to intersect the normal path of travel of the air to said propellers, and means associated with the tips of said wings and coacting with the fuselage for substantially confining the flow of the air over the wings to said propellers thereby increasing the lift to facilitate vertical rise of the airplane.

2. An airplane having a lifting surface, said lifting surface provided with an upwardly opening fore-and-aft channel, a propeller mounted adjacent the rear of said channel, with the propeller disc in a plane transverse to the channel axis, the distance of the propeller axis above the bottom of the channel being at least one third the diameter of the propeller, the side walls of said channel extending upwardly from the bottom of the channel a distance of at least one third of the propeller diameter, the center of said propeller being substantially mid-way of the channel side walls, and the width of the channel being substantially equal to the diameter of the propeller whereby material leakage of air between the propeller disc and channel is prevented, the region above the propeller disc being completely unobstructed.

3. An airplane comprising a fuselage provided with upwardly opening, fore-and-aft extending channels on its opposite sides, a propeller mounted adjacent the rear of each of said channels, with the propeller disc in a plane transverse to the channel axis, the distance of the propeller axis above the bottom of the channel being at least one third the diameter of the propeller, the side walls of said channel extending upwardly from the bottom of the channel a distance of at least one third of the propeller diameter, the center of said propeller being substantially mid-way of the channel side walls, and the width of the channel being substantially equal to the diameter of the propeller whereby material leakage of air between the propeller disc and channel is prevented, the region above the propeller disc being completely unobstructed.

4. The structure of claim 3, and wherein one of the walls of each channel is a vertical fin and another wall of said channel is a portion of said fuselage.

5. An airplane including a fuselage, wings carried by the opposite sides of the fuselage, propellers adjacent the wings, means mounting the propellers on the airplane with their axes extending generally fore-and-aft above the wings, mechanism mounting said wings for angular adjustment about their rear edges to intersect the normal path of travel of the air to said propellers, fins associated with said wings and coacting with the fuselage for substantially confining the flow of air over the wings to said propellers, the fins extending upwardly from the wings a distance of at least one third of the propeller diameter, the axis of each of said propellers being substantially mid-way of the side walls of a respective channel and the width of the channel being substantially equal to the diameter of the propeller, the region above the propeller disc being completely unobstructed.

WILLARD R. CUSTER.

REFERENCES CITED

The following references are of record in the file of this patent:

UNITED STATES PATENTS

| Number | Name | Date |
|---|---|---|
| 1,704,449 | Von Waldy | Mar. 5, 1929 |
| 1,824,250 | Wells | Sept. 22, 1931 |
| 1,794,923 | Rudkin | Mar. 3, 1931 |
| 1,550,149 | Condoyanni | Aug. 18, 1925 |
| 1,153,248 | Orme | Sept. 14, 1915 |
| 1,868,832 | Henter | July 26, 1932 |
| 2,194,596 | Henter | Mar. 26, 1940 |

FOREIGN PATENTS

| Number | Country | Date |
|---|---|---|
| 717,575 | France | Jan. 11, 1932 |
| 812,893 | France | Feb. 15, 1937 |